(12) United States Patent
Gaillard et al.

(10) Patent No.: US 8,701,702 B2
(45) Date of Patent: Apr. 22, 2014

(54) FLUID DELIVERY DEVICE INCLUDING A THERMOELECTRIC MODULE

(75) Inventors: Frederic Gaillard, Voiron (FR); Philippe Pantigny, Claix (FR); Emmanuelle Rouviere, Saint-Egreve (FR); Raphael Salot, Lans-en-Vercors (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 13/702,843

(22) PCT Filed: Jul. 4, 2011

(86) PCT No.: PCT/FR2011/000391
§ 371 (c)(1),
(2), (4) Date: Dec. 7, 2012

(87) PCT Pub. No.: WO2012/004471
PCT Pub. Date: Jan. 12, 2012

(65) Prior Publication Data
US 2013/0074954 A1    Mar. 28, 2013

(30) Foreign Application Priority Data
Jul. 6, 2010 (FR) .................................. 10 02849

(51) Int. Cl.
*F16K 17/38* (2006.01)

(52) U.S. Cl.
USPC .................. 137/468; 251/11; 251/129.01

(58) Field of Classification Search
USPC .................. 137/468; 251/11, 129.01
See application file for complete search history.

(56) References Cited

U.S. PATENT DOCUMENTS

| | | | | |
|---|---|---|---|---|
| 3,691,408 A | * | 9/1972 | Rosso | 310/306 |
| 4,618,091 A | * | 10/1986 | Buzzi | 236/12.12 |
| 6,019,114 A | * | 2/2000 | Rodgers | 137/386 |
| 6,848,462 B2 | * | 2/2005 | Covington et al. | 137/833 |
| 2005/0056799 A1 | * | 3/2005 | Malone | 251/11 |
| 2005/0284511 A1 | * | 12/2005 | Welle | 136/211 |
| 2008/0236643 A1 | | 10/2008 | Li | |
| 2009/0007953 A1 | * | 1/2009 | Hsu | 137/2 |
| 2011/0020140 A1 | * | 1/2011 | Park et al. | 417/48 |

FOREIGN PATENT DOCUMENTS

| | | |
|---|---|---|
| WO | WO 00/70313 | 11/2000 |
| WO | WO 0070313 A1 * | 11/2000 |
| WO | WO 02/10695 A2 | 2/2002 |

* cited by examiner

*Primary Examiner* — John Bastianelli
(74) *Attorney, Agent, or Firm* — Oliff PLC

(57) ABSTRACT

The fluid distribution device includes a first cavity at a first pressure and a second cavity at a second pressure lower than the first pressure. A partition separates the first cavity from the second cavity and a restricting valve is arranged between the first and second cavities. The partition includes a thermoelectric module having a hot side in thermal contact with the first cavity and a cold side in thermal contact with the second cavity.

7 Claims, 2 Drawing Sheets

FLUID DELIVERY DEVICE INCLUDING A THERMOELECTRIC MODULE

BACKGROUND OF THE INVENTION

The invention relates to a fluid distribution device comprising a pressure reducer comprising:
- a first cavity at a first pressure,
- a second cavity at a second pressure lower than the first pressure,
- a partition separating the first cavity from the second cavity,
- a restricting valve arranged between the first and second cavities.

STATE OF THE ART

Pressure reducers are mechanisms enabling a fluid to be made to flow from a first cavity, where said fluid is at a first pressure, to a second cavity where the fluid is then at a second pressure lower than the first pressure.

Fluid distribution devices using pressure reducers exist in plumbing valves: typically they are placed in a building at the level of the meter to reduce the pressure of the urban supply system, for example the water or gas supply, from about 10 bars to a pressure of about 3 bars enabling fluid to be distributed via the supply system of the building.

FIG. 1 illustrates a fluid distribution device according to the prior art. Such a device comprises a first cavity 1a at a first pressure and a second cavity 1b at a second pressure lower than the first pressure. The two cavities are separated by a partition 2. A restricting valve 4 is located between first and second cavities 1a, 1b and enables the fluid to flow from first cavity 1a to second cavity 1b modifying its pressure. The direction of flow of the fluid is represented by arrows F1 and F2. The two cavities 1a, 1b communicate with one another by means of a pass-through hole 3 in which a needle partially forming restricting valve 4 can move, and which enables the pressure to be regulated in the supply system downstream from restricting valve 4 in the direction of flow of the fluid, i.e. starting from second cavity 1b.

The current tendency is for distribution devices to become "smart" and, depending on the models, they can incorporate a meter and an emitting chip connected to the meter, enabling a technician of the corporation responsible for billing consumption to perform remote reading of the meter. This remote meter reading can be useful in particular when the distribution system subscriber is not present at his home and the meter is not directly accessible to the meter reader. Such smart meters are supplied by batteries, for example of button cell type, and they then present a major shortcoming as far as supplying power to the emitting chip is concerned when the battery is discharged.

OBJECT OF THE INVENTION

The object of the invention consists in providing a fluid distribution device that does not present the shortcomings of the prior art.

This object tends to be met by the appended claims and more particularly by the fact that the partition comprises a thermoelectric module having a hot side in thermal contact with the first cavity and a cold side in thermal contact with the second cavity.

According to one embodiment, the thermoelectric module is connected to an energy storage element so as to enable it to be recharged.

According to a development, the restricting valve is provided with electric adjustment means, and is supplied by the energy storage element.

According to another embodiment, the device can comprise a meter designed to measure the fluid consumption. The device can further comprise transmission means of the consumption measurements electrically supplied by the thermoelectric module or by the energy storage element.

BRIEF DESCRIPTION OF THE DRAWINGS

Other advantages and features will become more clearly apparent from the following description of particular embodiments of the invention, given for non-restrictive example purposes only and represented in the appended drawings, in which.

DESCRIPTION OF PREFERRED EMBODIMENTS

Unlike distribution devices according to the prior art, the device and its variants described in the following enables it to generate its own current using the Seebeck effect.

Figure 1:
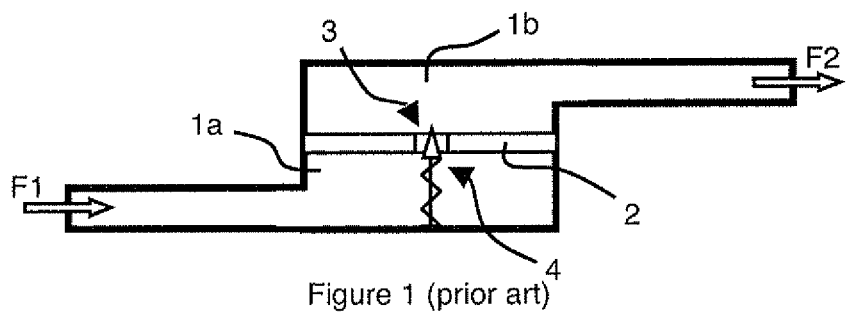
FIG. 1 represents a fluid distribution device according to the prior art.
Figure 2:
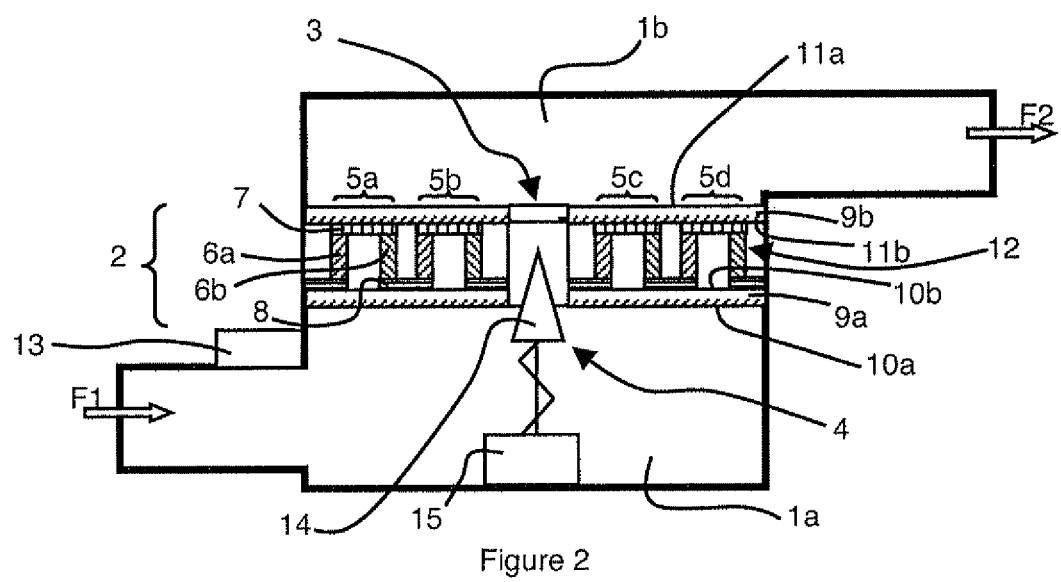
FIG. 2 illustrates a fluid distribution device according to an embodiment of the invention.

As illustrated in FIG. 2, the fluid distribution device comprises a pressure reducer which comprises a first cavity 1a at a first pressure, a second cavity 1b at a second pressure lower than the first pressure, and a partition 2 separating first cavity 1a from second cavity 1b. The device further comprises a restricting valve 4 arranged between first cavity 1a and second cavity 1b. The fluid is at a first pressure in first cavity 1a and at a second pressure in second cavity 1b. It is restricting valve 4 that enables the fluid to flow from first cavity 1a to second cavity 1b, while at the same time generating the pressure difference, referred to above, between the two cavities 1a, 1b, and therefore a temperature difference. In FIG. 2, the direction of flow of the fluid is represented by arrows F1 and F2. In fact, when the pressure reducer is not operating, i.e. when no fluid is flowing through the device, there is a temperature equilibrium between cavities 1a, 1b. When the fluid flows through the device, the pressure reduction of the latter between first cavity 1a and second cavity 1b generates a pressure difference at the level of the cavities on each side of partition 2, and therefore a temperature gradient on each side of partition 2.

Partition 2 comprises a thermoelectric module 12 having a hot side in thermal contact with first cavity 1a and a cold side in thermal contact with second cavity 1b. This thermoelectric module 12 enables the heat gradient to be used to generate current in particular when the fluid flows through the device. Preferably, the restricting valve is arranged so as to enable the fluid to flow through partition 2 at the level of thermoelectric module 12, i.e. it can be considered that the fluid flows through thermoelectric module 12.

Thermoelectric module 12 in fact comprises thermocouples 5a, 5b, 5c, 5d electrically connected in series and thermally connected in parallel. Each thermocouple is in thermal contact on the one hand with first cavity 1a and on the other hand with second cavity 1b.

A thermocouple 5a can comprise two studs 6a, 6b electrically connected to one another at one of their ends for example by an electric connecting element 7. Studs 6a, 6b are generally formed from two different thermoelectric materials or alloys. For example purposes, the materials used to form the studs can be semi-conductors (MgSiGeSn, SiGe, $Bi_2Te_3$, etc.) or semi-metals such as intermetallic oxides ($LiNaCoO_2$, $NaCoO_2$, $HgCoO_2$, etc.)

The thermocouples are arranged so as to use the temperature gradient between the two cavities 1a, 1b to generate current. In FIG. 2, the device comprises four thermocouples 5a, 5b, 5c, 5d. In order to optimize the efficiency of the thermoelectric module, thermocouples 5a, 5b, 5c, 5d are preferably electrically connected to one another in series at the level of the hot source (first cavity 1a in FIG. 2) by linking elements 8. In the particular example of FIG. 2, the thermocouples each have their electric connecting element 7 in thermal contact with second cavity 1b (which then forms the cold source). The thermoelectric module can naturally be turned the other way, i.e. the thermocouples can have their electric connecting elements 7 in thermal contact with first cavity 1a, and linking elements 8 between the thermocouples can be in thermal contact with second cavity 1b, what is essential is to be able to use the temperature gradient between the two cavities when performing pressure reduction of the fluid.

Electric connecting elements 7 and linking elements 8 can be formed by thermally conducting metals having a Seebeck coefficient that is zero or close to zero, such as for example gold.

What is meant by thermal contact is that the temperature of the fluid in the first cavity 1a is transmitted to the hot side of thermoelectric module 12, and that the temperature of the fluid in second cavity 1b is transmitted to the cold side of thermoelectric module 12.

In the particular example of FIG. 2, partition 2 is formed by two plates 9a, 9b sandwiching the thermoelectric module. Studs 6a, 6b of thermocouples 5a, 5b, 5c, 5d are preferably perpendicular to the two plates 9a, 9b, which are preferably parallel to one another. First plate 9a comprises a first wall 10a partially delineating first cavity 1a, and a second wall 10b in contact with linking elements 8. Second wall 10b is naturally either electrically insulating or electrically insulated from linking elements 8 by interposition of an electrically insulating material. Second plate 9b comprises a first surface 11a partially delineating second cavity 1b, and a second surface 11b in contact with connecting elements 7 of the thermocouples. Second face 11b is naturally either electrically insulating or electrically insulated from connecting elements 7 by interposition of an electrically insulating material. First and second plates 9a, 9b can be formed from a material or an alloy of materials that is a good temperature conductor to improve the reactivity of the device. This enables rapid transmission of the temperature of the fluid of first cavity 1a to the hot side of thermoelectric module 12, and the temperature of the fluid in second cavity 1b to the cold side of thermoelectric module 12. In the case where the fluid is flowing continuously through the device, the material of first and second plates 9a, 9b is of no importance, as in continuous operation an equilibrium of the temperature gradient between the cavities is obtained, and the thermal conductivity at the level of plates 9a, 9b no longer plays any role.

According to the embodiment illustrated in FIG. 2, studs 6a, 6b of the thermocouples are separated by air acting as thermal insulator to preserve the best temperature gradient between the hot source and cold source. This implies that partition 2 comprises a closed and sealed internal space in which thermocouples 5a, 5b, 5c, 5d are formed. The internal space is preferably at a partial vacuum, for example of $10^{-5}$ bars, to improve the thermal insulation. According to an alternative embodiment, the internal space is filled by a silicon aerogel presenting high thermal insulation properties, such as for example a $SiO_2$-based aerogel.

The particular arrangement of thermoelectric module 12 described in the foregoing is an example embodiment only. The person skilled in the trade will naturally be able to adapt any thermoelectric module enabling the temperature gradient between first and second cavity 1a, 1b to be taken advantage of. For example, partition 2 can be a bulk plate in which the thermoelectric module is formed. The material of the bulk plate is then thermally and electrically insulating, the thermocouples being formed by filling of recesses made in the bulk plate before the linking and connecting elements are formed.

According to another embodiment, the partition is formed by assembly of sintered bars made from thermoelectric materials electrically connected by linking and connecting elements so as to form a series of thermocouples as described in the foregoing. The two plates then sandwich this assembly, the plates being previously electrically insulated at least at the level of the linking and connecting elements.

Figure 3:
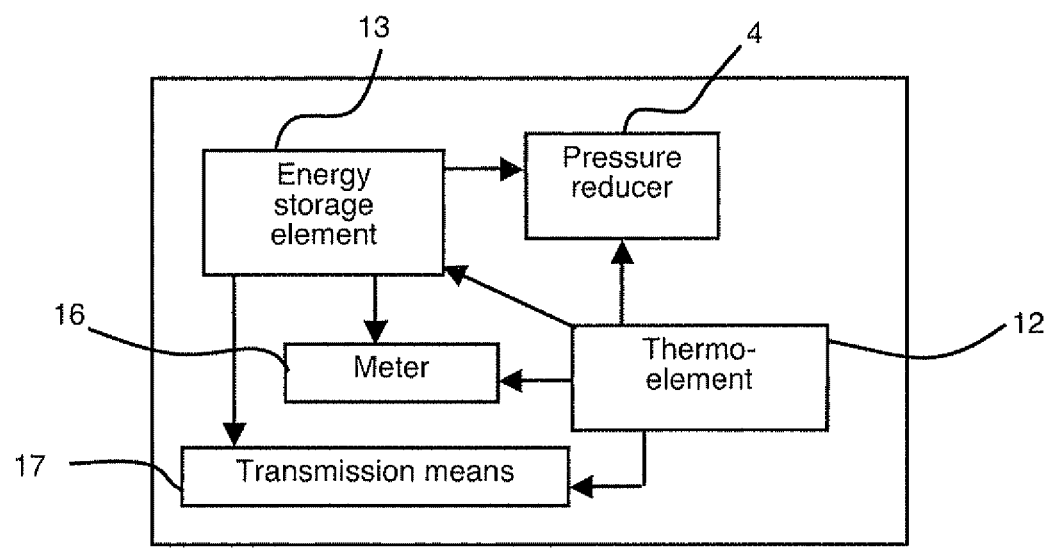
FIG. 3 illustrate a block diagram of the possible functionalities of the fluid distribution device.

According to an embodiment illustrated in FIGS. 2 and 3, thermoelectric module 12 is connected to an energy storage element 13 so as to enable recharging of said energy storage element (for example a disposable or rechargeable battery). When the fluid flows through the distribution device, the energy generated by thermoelectric module 12 can thus be stored in the storage element for the purposes of future use. If the device does not comprise an energy storage element 13, the generated current can be input to an electric power system.

According to a development, restricting valve 4 is also provided with electric adjustment, and is supplied, for example by current, by energy storage element 13. What is meant by electric adjustment is that it is possible to control restricting valve 4 to modify the pressure difference between first cavity 1a and second cavity 1b. Such an adjustment for example enables the distribution device to perform servo-regulation in case of loss of pressure in the distribution system. It may in fact be necessary to adjust the pressure differences, or even to servo-control the pressure differences according to the installations located downstream. The differences of size of the pipes downstream and upstream from the device, or installations requiring different pressures in the course of use, can be cited for example purposes.

According to an alternative embodiment, electrically-adjustable restricting valve 4 can also be supplied, for example with current, directly via thermoelectric module 12. In this particular case, adjustment is only possible when the fluid is flowing through the device.

As in FIG. 2, electrically-adjustable restricting valve 4 can be formed by a needle 14 able to move so as to more or less obstruct a hole 3 made in partition 2 and connecting first cavity 1a to second cavity 1b. Needle 14 can then be moved in translation by a motor 15 partially forming valve 4. This motor 15 can be electrically supplied by energy storage element 13 or directly by thermoelectric module 12. Motor 15 can be servo-controlled by an electronic card and at least one pressure sensor (not shown) located downstream from valve 4 in the direction of flow of the fluid. The sensor located downstream enables the distributed pressure and the temperature gradient to be controlled and, if required, enables the position of the needle 14 to be adjusted to maintain a constant pressure in the distribution system downstream from the distribution device. Naturally, in combination with the embodiment where the partition comprises two plates 9a, 9b, hole 3 is made in such a way as not to compromise the tightness of the internal space of partition 2.

According to another development, the device can comprise a meter 16, as in FIG. 3, designed to measure the fluid consumption. The fluid consumption is representative of the quantity of fluid flowing from first cavity 1a to second cavity 1b. This meter 16 can be of mechanical type or of electronic type. The meter can also comprise a consumption display, this display being able to be of mechanical type or of LCD type. In the case where the display is of LCD type and/or the meter is of electronic type, the latter can be supplied with power by energy storage element 13, or directly by thermoelectric module 12. In FIG. 3, the starting point of each arrow indicates a current source and the arrival point of the arrow indicates the element receiving the current.

As indicated previously in the prior art, it may be interesting to be able to read the fluid consumption meter easily. The device can comprise transmission means 17 of the consumption measurements recorded by the meter, these means enabling fluid distribution companies to perform readings even in situations where the meter is not accessible. Transmission means 17 can be supplied with electricity by thermoelectric module 12, or by energy storage element 13. Naturally, if transmission means 17 are supplied directly by thermoelectric module 12, these means can only transmit if the fluid is flowing through the distribution device, or if a sufficient temperature gradient is always present between the two cavities to generate a sufficient current.

Measurement transmission means 17 can comprise an antenna (not shown) for transmitting the data representative of the fluid consumption. This data can be transmitted in continuous manner, for example with an identifier of the associated distribution device. Transmission means 17 can also comprise a receiver antenna (not shown), the data then being transmitted only on receipt of a request by transmission means 17. The variant with transmission after receipt of a request enables the power consumption of the distribution device to be limited, transmission means 17 being in a standby state so long as a request has not been received.

The use of thermoelectricity in the fluid distribution device thus enables the latter to be provided with new functions such as display, communications, automation, etc., while at the same time avoiding the device being dependent on external current sources.

The fluid can be water, gas, or any type of liquid or gaseous body. In the scope of use for water distribution at the level of a private home, the pressure difference between the water of the town distribution system at 10 bars and the water in the private pipes of the residential premises at 3 bars enables a difference of about 10° C. to be obtained between the two cavities. Such a temperature difference enables a voltage of 10 mV and 100 mV associated with a current comprised between 1 µA and 10 µA to be generated, depending on the number and arrangement of the thermocouples. For example, by placing ten thermocouples made from $Bi_2Te_3$ distributed on a 10 cm*10 cm support, it is possible to obtain 200 µV/K (K representing degrees Kelvin), with a temperature gradient of 15° C.

This device can be installed in any type of fluid distribution installation where it is necessary to reduce the pressure. The first and second cavities can then be respectively connected to a fluid inlet pipe and to a fluid outlet pipe.

A single fluid can flow through this device, this fluid being at a first pressure in the first cavity and at a second pressure in the second cavity.

The invention claimed is:

1. A fluid distribution device comprising a pressure reducer comprising:
   a first cavity at a first pressure,
   a second cavity at a second pressure lower than the first pressure,
   a partition separating the first cavity from the second cavity,
   a restricting valve arranged between the first and second cavities,
wherein the partition comprises a thermoelectric module having a hot side in thermal contact with the first cavity and a cold side in thermal contact with the second cavity.

2. The device according to claim 1, wherein the thermoelectric module is connected to an energy storage element and is configured to recharge the energy storage element.

3. The device according to claim 2 wherein the restricting valve is provided with an electric adjustment device and is supplied by the energy storage element.

4. The device according to claim 1, comprising a meter designed to measure a fluid consumption.

5. The device according to claim 4, comprising transmission means electrically supplied by the thermoelectric module and configured for transmitting measurements of the fluid consumption.

6. The device according to claim 4, comprising transmission means electrically supplied by the energy storage element and configured for transmitting measurements of the fluid consumption.

7. The device according to claim 1, wherein the restricting valve is arranged for enabling the fluid to flow through the partition close to the thermoelectric module.

* * * * *